Figure 1:
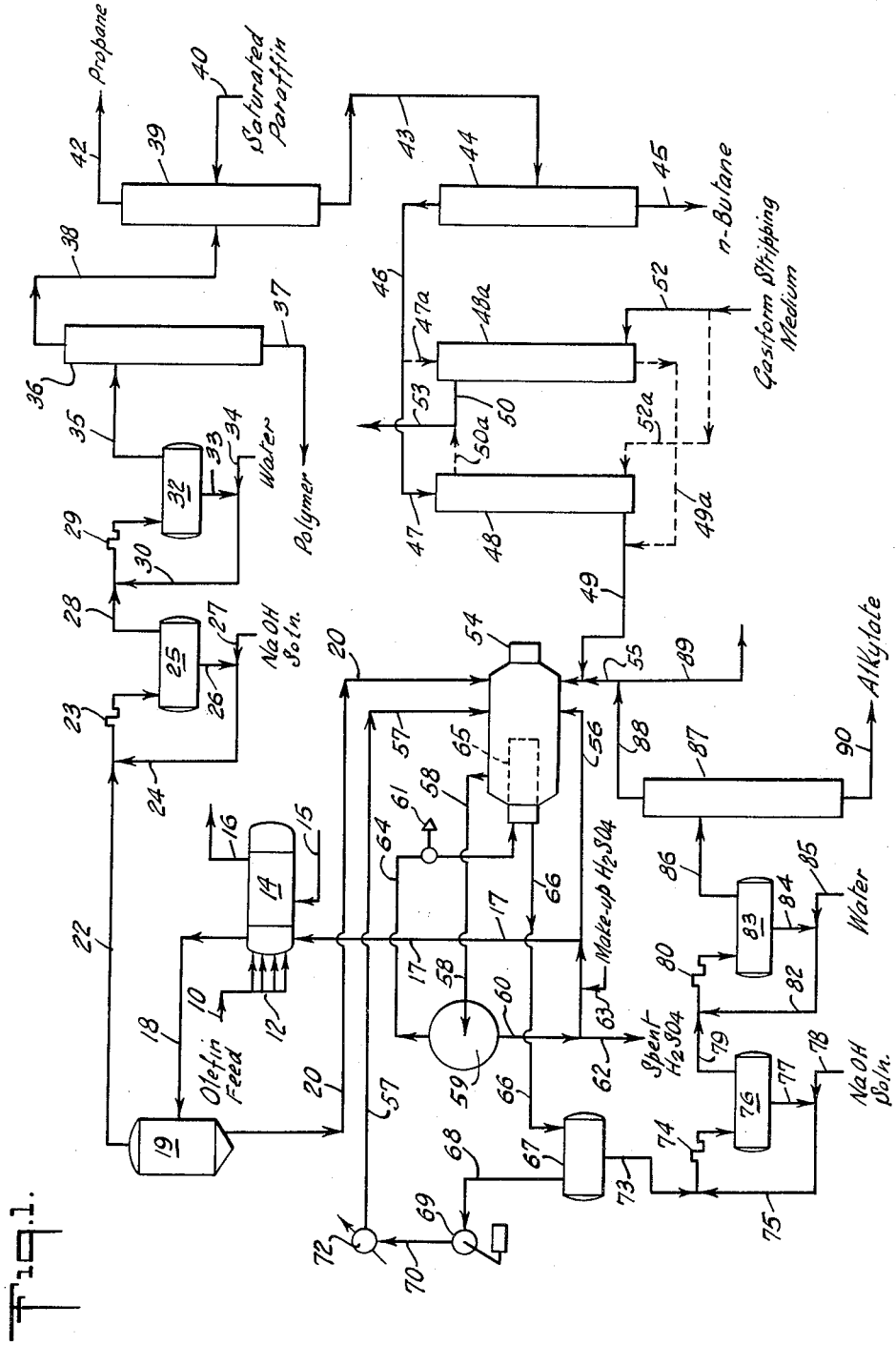

3,052,743
ALKYLATION PROCESS
David K. Beavon, Darien, Conn., assignor to Texaco Inc., a corporation of Delaware
Filed June 11, 1958, Ser. No. 741,332
2 Claims. (Cl. 260—683.61)

This invention relates to an improved process for catalytic alkylation, and more specifically to such process wherein an olefin-based alkylatable material is alkylated with isobutane.

In an alkylation of this type a preponderance of isobutane (generally as much as 70 to 80 mol percent or even more of all the hydrocarbons in the reaction mixture) over alkylatable material and hydrocarbon diluents is used to direct the reaction towards production of the most valuable aviation or automotive fuels. Consequently, a great deal of isobutane must be recovered and recycled for reuse if the process is to be practical.

The alkylatable material for reacting with isobutane is olefin-based, i.e. it is generally an olefinic hydrocarbon itself such as propylene, butylene or the like, but it also can be an alkyl sulfate or fluoride (as obtained for example in a so-called "two stage" process wherein an olefinic hydrocarbon is absorbed in sulfuric acid or HF as a first stage in the alkylation operation), or an alkyl halide, suitably an alkyl fluoride or chloride which can be made readily from olefinic hydrocarbons by other means.

The contacting of the excess isobutane with the alkylatable material and catalyst is done in liquid phase; the desirable low temperature, e.g. ordinarily below about 75° F. and advantageously 30° F. to 55° F., can be maintained in the alkylation zone either by autorefrigeration of that zone or by effluent refrigeration applied to that zone.

In an effluent refrigeration system the output of the alkylation zone is separated into a hydrocarbon phase and a liquid catalyst phase, the separated hydrocarbon phase is passed into a flash zone of lower pressure where any low boilers, including some of the isobutane present, are vaporized with concomitant cooling of the remaining liquid hydrocarbons including alkylate, and at least a part of the remaining liquid hydrocarbons are used to refrigerate the reaction zone indirectly. In such operation the alkylation zone and effluent separator are maintained under sufficient pressure to keep all components in the liquid phase. Flashing in a flash zone as referred to herein denotes the practically adiabatic forming of chilled vapors and residual liquid by reduction of pressure on a liquid hydrocarbon material. In an autorefrigeration system the lower boiling hydrocarbons, including some of the isobutane present, are evaporated directly from the contents of the alkylation reaction zone to cool it.

Other alkylation conditions include use of a mol ratio of isobutane to olefin supplied to the alkylation zone (including isobutane recycle) substantially in excess of 1:1, and generally between about 4:1 and about 10:1; use of a liquid catalyst: liquid hydrocarbon volume ratio between about 0.5:1 and 5:1 and preferably about 1:1; and use of alkylation strength catalyst, e. g. sulfuric acid of at least about 88% strength, HF of at least about 85% titratable acidity, or an aluminum chloride-hydrocarbon complex liquid catalyst, e.g. one having an active aluminum chloride content (expressed as equivalent aluminum) of at least about 15 weight percent. Advantageously the catalyst will be a liquid which is nonvolatile under the alkylation reaction conditions, and preferably it will be sulfuric acid maintained at about 88 to 92% strength by the addition of make-up 98–99.5% sulfuric acid in amount sufficient to maintain this strength while purging spent acid from the system.

In many refineries an important part or all of the isobutane available for alkylation processing is obtained by fractionally distilling (deisobutanizing) a preponderantly paraffinic (that is normal and isomeric paraffins) mixture. Such mixture will have a normal butane to isobutane mol ratio between about 0.2:1 and about 4:1. The overhead distillate of isobutane concentrate so fractionated for use in the alkylation reaction zone will contain at least about 90+ mol percent isobutane, usually 92–96 mol percent isobutane for best quality alkylate fuel production.

To maintain the desired high preponderance of isobutane over all the other hydrocarbons in the alkylation reaction mixture with an isobutane stream such as this containing as much as about 10% diluents, of course, requires the handling and rehandling of much isobutane, and this adds nothing but expense to the production of the alkylation plant because about 2½ to 4 or even more barrels of pure isobutane must be fed to the alkylation zone per barrel of diluent hydrocarbons.

Furthermore, the reasonably clean separation of normal butane from isobutane (92–96% isobutane in distillate) by fractional distillation is tedious and expensive because of the comparatively small boiling point spread between these isomeric hydrocarbons. Thus, for example, in a typical commercial operation wherein about 95% isobutane distillate is desired from a deisobutanizing fractional distillation of a mixed paraffinic hydrocarbon feed having n-butane to isobutane ratio of about 0.46:1, a fractionating column having 60 bubble cap trays is used, and more than 10 barrels of overhead condensate are refluxed to the column per barrel of isobutane-rich distillate drawn off as output. Even then a significant amount of normal butane is recycled to the alkylation reaction zone with the isobutane in said distillate.

However, a great deal more isobutane than this can be distilled overhead in the same column and with the same utilities consumption (i.e. heat, cooling water, electric power) when 10 to 25 mol percent of the isobutane concentration in the overhead distillate product output is sacrificed; or, conversely, the same total quantity of isobutane can be obtained overhead at lower utilities cost and lower distilling equipment investment if such sacrifice is made. Thus, were the same commercial deisobutanizer feed as described hereinbefore fractionally distilled to obtain only about 80 mol percent isobutane in the overhead using the same equipment, the molal reflux ratio could be reduced by as much as one-half to two-thirds. This, of course, involves much lower boil-up and condensing loads on the equipment and less utilities expenses. Also illustrative of the situation is the fractional distillation of a feed consisting of roughly 50 mol percent normal butane and the balance isobutane to obtain an overhead product of greater than 90% isobutane content; in such instance at least about 60 to 70 actual plates and a molal reflux:product ratio (i.e. reflux ratio) of at least about 8:1 are desirable; but when about 80% isobutante concentration is sought in the distillate from the same feed substantially fewer actual plates are needed and the molal reflux ratio can be roughly halved.

My improvement for operating a catalytic operation of the type described wherein isobutane for use in the process is obtained from a preponderantly paraffinic mixture having a butane to isobutane mol ratio between about 0.2:1 and 4:1 comprises: fractionally distilling said paraffinic mixture, thereby separating it into a bottoms product enriched in normal butane and an overhead distillate of isobutane concentrate; maintaining the isobutane content of said overhead distillate between about 65 and about 85 mol percent in a broadly inverse relationship to the normal butane/isobutane mol ratio of said paraffinic mixture. (Thus when the feed to this deisobutanizing fractional distillation is in the low range of about 0.2:1–1:1 normal butane-isobutane ratio, I operate this fractional distillation to give an isobutane concentration in the overhead distillate product of 80–85%, and when said ratio approaches 2:1–4:1, I operate this distillation for a 65–75% isobutane concentration in the overhead distillate product. Such fractional distillation is simple and requires a comparatively low reflux ratio and attendant utilities cost while making a giant step towards raising the isobutane concentration of the distillate product.) It will be understood that the feed to the deisobutanizing fractional distillation can be one or a plurality of hydrocarbon streams admitted to a distilling column in conventional fashion, and when more than one stream makes up such feed, the aforesaid butane/isobutane ratio applies to the overall feed on a mixed basis rather than to a particular stream composition.

The thus crudely concentrated overhead isobutane distillate is then contacted with a mineral sorbent selective for straight chain hydrocarbons to the substantial exclusion of non-straight chain hydrocarbons; this produces a treated isobutane effluent stream virtually free of normal butane—which is eminently suitable for the alkylation reaction because of its purity. Advantageously, the maximum normal butane in the isobutane effluent is about 6%, and preferably it will be between 0.1 and 4 percent. The alkylatable material is then alkylated with isobutane including that from said effluent stream. The resulting hydrocarbons from the alkylation are separated from the catalyst, and product alkylate and unreacted isobutane are recovered from these resulting hydrocarbons.

While a variety of mineral sorbents are suitable for use in my process such as dehydrated analcite, dehydrated chabazite, and the like, the mineral sorbent I prefer is a Type A zeolite having effective pore size between about 4 A. and about 6 A. and, preferably, about 5 A. The properties and structure of the Type A zeolite, which is not found in nature, are described in the articles of Breck et al. and Reed et al. on pages 5963–5977 of the Journal of the American Chemical Society, No. 23, vol. 78.

The formula (less crystal water which is driven off to make the Type A zeolite receptive to straight chain hydrocarbons) represented for the sodium form of the Type A zeolite (having about 4 A. effective pore diameter) in the above-mentioned articles is $$Na_{12}(AlO_2)_{12} \cdot (SiO_2)_{12}$$

Type A zeolite having effective pore size or pore diameter of about 5 A., preferable for sorbing straight chain hydrocarbons to the substantial exclusion of non-straight chain hydrocarbons in a mixture thereof, is most readily made by exchanging calcium for some of the sodium in a hydrated sodium form of the Type A zeolite using an aqueous medium for this ion exchange, then removing crystal water by dehydrating, suitably at atmospheric pressure and a temperature between about 220° and 500° F. Advantageously, such sorptive zeolite has 0.3–0.95 of its exchangeable cation content as calcium (that is, computed as a ratio of the number of equivalents of calcium metal to the sum of the equivalents of all of the exchangeable metals such as $Zn^{++}$, $Cd^{++}$ $Na^+$, $Li^+$, $K^+$, $Ca^{++}$, etc. in the resulting Type A structure). Other suitable exchangeable cations and their proportions for making Type A zeolite with effective pore diameter of about 5 A. include zinc and cadmium (0.3–0.95), manganese (0.25–0.95), and strontium (0.3–0.90). An effective pore size of about 6 A. can be effected similarly by exchanging sodium for magnesium.

Currently a good grade of calcium sodium aluminosilicate Type A zeolite having effective pore diameter of about 5 A. is marketed under the name "5A Molecular Sieve." Its capacity for sorption of straight chain hydrocarbons is good, e.g., approximately 40–45 cc. of normal butane per gram at a temperature of 75° F. and pressure of 760 mm. Hg as against approximately 1–6 cc. of isobutane per gram of the zeolite under the same conditions. Its manganese, cadmium, and zinc counterparts have approximately the same capacity and selectivity and are more particularly described in the following copending U.S. patent applications: Eugene E. Sensel, Serial No. 652,146, filed April 11, 1957, now Patent No. 2,988,577; and Eugene E. Sensel, Serial No. 652,147, filed April 11, 1957. Preparation of suitable calcium-sodium alumino-silicate Type A zeolites having effective pore size of about 5 A. are shown in the following copending U.S. patent applications: Eugene E. Sensel, Serial No. 617,734, filed October 23, 1956, now Patent No. 2,841,471; and J. H. Estes, Serial No. 617,735, filed October 23, 1956, now Patent No. 2,847,280.

The drawings are flow diagrams showing various ways my invention can be adapted to plant operation using the conventional reactor of the type employing internal recirculation, e.g., the so-called Stratco contactor. It will be understood that the various vessels shown in the drawing are shown in the singular for simplicity, but can stand for one or more of the same kind of vessels (towers, tanks, condensers) connected in series or parallel arrangement as necessary or desired. For clarity only the major equipment is represented in the drawings. Pumps, most valves, instruments, surge tanks, condensers, reflux returns, and reboilers are not shown, but are to be employed in conventional manner where necessary or desirable. It is to be understood also that, instead of a contactor, the alkylation reactor can be of other conventional type such as the pump and time tank type wherein the average time of contact of the alkylation mixture and catalyst is generally between about 5 and 45 minutes, and advantageously, 5 to 20 minutes.

Alternatively, the reaction vessel system can be of the autorefrigeration type, e.g. so-called cascade reactor, wherein the reaction zone is refrigerated by evaporation of low boiling hydrocarbons including isobutane directly from the reaction zone at a fairly low pressure, the cascade reactor ordinarily involving a single horizontal shell containing integrally a series of alkylation reaction zones and a hydrocarbon phase-catalyst phase settler.

Referring to FIGURE 1, liquid phase olefin feed, i.e. propylene with diluent propane therein as well as promotional butylene and associated iso and normal butanes, is fed through line 10 into header 12, and portions of it are injected at the several inlets in the tube side of multipass heat exchanger 14. Herein it is contacted with a stream of 92% sulfuric acid entering the tube side of heat exchanger through line 17. The several olefin portions are dispersed in the acid and regulated in rate to maintain excellent mixing with the sulfuric acid and to keep all local temperatures low, e.g. below about 60° F. and, advantageously, below about 40° F. In this instance the temperature is 30° F., but it should be recognized that even lower temperatures, e.g. 0° to −20° F., are possible. Heat exchanger 14 is cooled by refrigerant on the shell side entering through line 15 and withdrawn through line 16. Vapor phase feed of olefins to the first stage is also possible.

In the contacting the olefins are absorbed into the acid as alkyl sulfates, while the saturated hydrocarbons form a separatable reject hydrocarbon phase. The entire mixture is withdrawn through line 18 and fed to separator 19. The resulting rich acid, containing olefins in the form of alkyl sulfates, is withdrawn through line 20 and passed into alkylation contactor 54. The reject liquid hydrocarbon phase, containing saturated hydrocarbons and polymer from the acid contacting in exchanger 14 and thereafter, is withdrawn from the separator through line 22, then washed in mixer 23 with aqueous caustic soda being recirculated from separator 25 through lines 26 and 24. Sodium hydroxide strength of the wash solution is maintained by purging spent caustic by means not shown and adding fresh caustic solution through line 27. The caustic washed reject hydrocarbon phase then passes through line 28 into mixer 29 wherein it is washed with water being recirculated from separator 32 and lines 33 and 30. Make-up water is added through line 34 as is necessary and contaminated water purged from the system by means not shown. The water washed reject liquid hydrocarbon phase is withdrawn from settler 32 by means of line 35 and passed into distilling column 36, optionally with the injection of a small amout of gas oil, kerosene distillate, or other petroleum fraction having initial boiling point of about 200–250° F. at atmospheric pressure. Distillation is conducted in tower 36 to leave a bottoms product of polymer formed from the acid contacting (made more readily flowable by the residuum of said gas oil, kerosene distillate, or the like). It should be understood, however, that in some cases a highly efficient first stage operation at a very low temperature (with attendant suppression of polymer formation) can render this distillation and oil treating dispensable.

The overhead distillate from tower 36 is a mixture of light saturated hydrocarbons, preponderantly propane, isobutane and normal butane. These are passed through line 38 into depropanizer 39. The depropanizer is operated in conventional fashion to give a sharp fractional distillation of propane overhead distillate which is removed through line 42 and a bottoms fraction of $C_4+$ materials to augment the supply of isobutane to the alkylation reactor. A saturated paraffin feed containing isobutane and normal butane is fed into the depropanizer through line 40, this saturated paraffin feed containing ordinarily from about 30 to about 80 mol percent normal butane along with the isobutane desired for alkylation, and, in this instance, about 40 mol percent.

The depropanizer bottoms is the fresh isobutane fed to this embodiment of my alkylation process. It generally will have from about 15 to 80 mol percent normal butane (and in this instance about 45 mol percent) with the balance being isobutane and associated hydrocarbons boiling above propane. The mol ratio of normal butane to isobutane is 0.85:1. These bottoms are fed into deisobutanizer 44 having 60 bubble cap trays. Herein normal butane and higher boilers than normal butane are separated as a bottoms fraction and withdrawn from the system through line 45. The fractional distillation is conducted in regular fashion except that it is operated to give an overhead distillate having isobutane content of about 80 mol percent instead of 90+ mol percent. To operate for a deisobutanizer overhead substantially below about 65 mol percent isobutane puts too heavy a load of sorption work on the mineral sorbent following for the most effective operation, while to so operate for substantially more than about 85 mol percent isobutane requires many more fractionating trays and/or a great deal more reflux and utilities consumption.

The overhead distillate, an isobutane concentrate, is passed through line 46 and inlet 47 into a mineral sorbent bed in case 48, the sorbent bed being made of $\frac{3}{16}''$ x $\frac{3}{16}''$ cylindrical pellets of a calcium sodium alumino-silicate Type A zeolite having 0.8 of its exchangeable cation content as calcium and an effective pore size of about 5 A. The deisobutanizer and sorbent case are operated under substantially the same pressure, that is generally from 50–150 p.s.i.g. and in this instance, about 100 p.s.i.g. Parallel with sorbent case 48 is similar sorbent case 48a having inlet 47a for isobutane concentrate. While the sorbent in case 48 is operating to remove virtually all of the normal butane from the isobutane concentrate (i.e., not leaving more than about 4 mol normal butane in the concentrate, and, about 2% in this specific instance) and is gradually reaching its saturation point, the sorbent in case 48a is being desorbed of normal butane at about atmospheric pressure after having been saturated from a previous sorbing cycle.

To assist in the desorbing, a gasiform stripping medium, e.g. a lower saturated $C_1$–$C_4$ hydrocarbon, hydrogen, nitrogen, or the like can be passed in inlet 52, through the sorbent bed of particles in case 48a, and out discharge line 50 and header 53. In this instance the desorbing assistant gas is hydrogen from a catalytic reforming operation. Periodically the operation of cases 48 and 48a are reversed with isobutane concentrate entering line 47a, case 48a, and outlet 49a, while stripping medium passes through line 52a, case 48, and outlet 50a. During stripping, of course, the particular sorbing case being stripped is valved off from the isobutane concentrate or the normal butane-free isobutane effluent.

Alternatively, it is possible to desorb by contacting the laden sorbent particles with molten Wood's metal or similar molten metal at a temperature not in excess of about 1000° F. and at a pressure which is preferably the same as the top of the deisobutanizer.

For the sorption of normal butane from isobutane the pressure on the mineral sorbent chamber can be, for example, from about atmospheric to 500 p.s.i.g. or even higher, the pressure above deisobutanizer operation, of course, being supplied by a compressor or pump (depending upon whether the isobutane concentrate supplied to the sorbing operation is in vapor or liquid state). In the operation shown in FIGURE 1 the isobutane concentrate is supplied as a vapor from the partial condensation of the distillate in deisobutanizer 44 and is under deisobutanizer tower pressure only (column top pressure). An advantageous sorbing temperature is between about 50° and about 200° F. and, if desired, the desorbing temperature can be higher than the sorbing temperature. In the instance depicted in FIGURE 1 sorption is operated at about 130° F. and the average desorption temperature is about 200° F.

Another convenient and rapid way to change from sorbing conditions to desorbing conditions is to operate both these phases essentially isothermally at a temperature from about 50° to 200° F. and to sorb under a pressure of 50 to 500 p.s.i.g., and preferably deisobutanizer overhead pressure, then to desorb at a lower pressure in the range from 0 to 100 p.s.i.g. or even at a subatmospheric pressure, advantageously with a flow of gasiform stripping medium as hereinbefore described.

The treated isobutane effluent stream virtually free of normal butane (2 mol percent) is removed through line 49 and passed into alkylation contactor 54, together with a stream of recovered isobutane from line 55 and condensed recycle isobutane from line 57. The reaction mixture is passed through line 58 into separator 59 wherein it is separated into a liquid catalyst phase of sulfuric acid and a liquid hydrocarbon phase. Separated liquid catalyst is removed from the separator through line 60, purged of a quantity of spent acid in conventional fashion in line 62 and made up with 98% make-up acid entering line 63. A portion (all of the sulfuric acid catalyst in the particular embodiment shown in FIGURE 1) can be then sent to line 17 into contact with the olefin feed in heat exchanger 14 as hereinbefore described; the balance of the sulfuric acid, if any, is passed directly through line 56 to alkylation contactor 54.

The separated hydrocarbon effluent phase is withdrawn from separator 59 by means of line 64 and passed through pressure reducing valve 61 wherein the pressure is reduced from 50 p.s.i.g. to 0 p.s.i.g. with the resultant flashing of principally isobutane from the hydrocarbon phase, thus leaving a chilled remaining hydrocarbon liquid. This remaining liquid and flashed vapors are fed into alkylation zone cooling coils 65, wherein additional isobutane is vaporized, and the resulting mixture of vapor and liquid is passed through line 66 into vapor-liquid separator 67. The flashed and otherwise generated vapors are withdrawn through line 68, compressed in compressor 69, passed out line 70, and condensed in condenser 72, then recycled through line 57 to contactor 54 to assist in maintaining isobutane concentration in the reaction mixture relative to all free and combined hydrocarbons at about 80%.

The separated liquid phase hydrocarbons comprising unreacted isobutane and alkylate pass from separator 67 through line 73 into mixer 74 wherein they are washed with recirculated caustic solution from line 75. The mixture is passed into caustic settler 76 wherefrom aqueous caustic soda solution is withdrawn for recirculation through line 77, made up with make-up caustic soda solution entering line 78, and purged of spent caustic solution by means not shown to maintain sodium hydroxide strength and solution volume.

The caustic washed hydrocarbon phase then passes through line 79 into mixer 80 and is scrubbed with recirculated water entering line 82. The mixture is discharged into water settler 83 wherefrom water is recycled by means of line 84, replenished through line 85, and purged by means not shown. The water washed hydrocarbon mixture is then discharged through line 86 into fractional distillation tower 87. Herein an overhead distillate of practically pure isobutane is withdrawn in line 88 and passed through line 55 into alkylation reaction zone 54. To precool the isobutane feeds from lines 49 and 55, this mixture can be put through a heat exchanger (not shown) and cooled indirectly with the cool hydrocarbon mixture leaving vapor-liquid separator 67 through line 73.

A small purge of isobutane is withdrawn from the system through line 89 and sent to tankage or used in other processes. This prevents buildup of diluents in the alkylation zone. The bottoms fraction from the distillation in tower 87 is total alkylate, and it is withdrawn through line 90. The total alkylate can be further fractionally distilled in a rerun tower to separate a light alkylate fraction for motor fuel, having an end boiling point of 400° F., and alkylate bottoms useful for cracking stock or the like. It is to be noted that this system uses a simple alkylate-isobutane separation and no debutanizing fractional distillation to separate normal butane from alkylate. Therefore, in addition to running a very economical deisobutanizing fractional distillation, it saves the investment and operating costs of a conventional product debutanizer.

Figure 2:
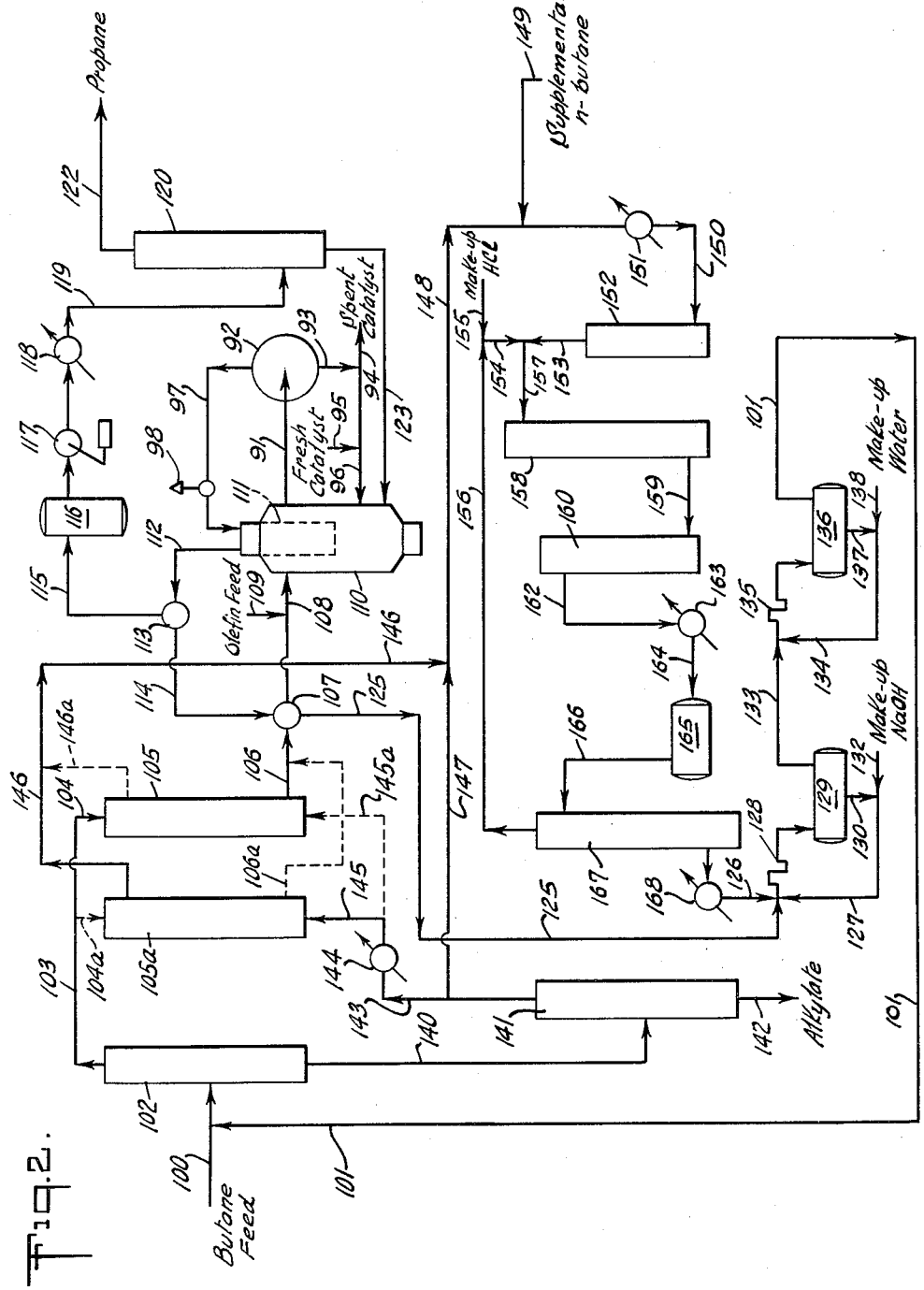

FIGURE 2 shows how my alkylation scheme can be integrated with a butane isomerization unit. A saturated paraffin feed, i.e., hydrocarbon feed containing $C_4+$ hydrocarbons including isobutane, is fed into the system through line 100 together with neutral crude butane isomate and neutral crude alkylate, both from line 101. The mixed feed, having a normal butane to isobutane mol ratio of 0.46:1 is passed into deisobutanizer 102 which is operated to give a bottoms product of substantially all normal butane and higher boiling hydrocarbon which is discharged through line 140 and an overhead distillate of isobutane concentrate containing about 80 mol percent isobutane.

Condensed isobutane concentrate is passed in liquid phase through line 103 into inlet 104 of sorbent case 105 wherein it is contacted under deisobutanizer overhead pressure with 4–8 mesh particles of calcium sodium aluminosilicate Type A zeolite having about 0.8 of its exchangeable cation content as calcium and an effective pore size of about 5 A. The resulting treated isobutane effluent stream, virtually free of normal butane (3 mol percent) is withdrawn through line 106, passed through heat exchanger 107, mixed with the olefin feed, a butylene feed, entering line 108 through inlet 109, then passed into contactor 110.

While sorbent case 105 is being operated to abstract normal butane from the isobutane concentrate, parallel sorbent case 105a, having valved-off inlet 104a and valved-off outlet 106a, is being purged of sorbed normal butane at about atmospheric pressure from a previous cycle with a flow of hot normal butane vapor entering line 145, passing through the sorbent particles in case 105a, and being withdrawn together with desorbed normal butane through line 146. During this time, of course, inlet 145a and outlet 146a of sorbent case 105 are closed.

The contents of reactor 110 are retained under about 35 p.s.i.g. which is sufficient to keep them in the liquid phase. The effluent from the alkylation reactor passes through line 91 into separator 92 wherein it is separated into a liquid catalyst phase (92% $H_2SO_4$) and a liquid hydrocarbon effluent phase. Liquid catalyst is recycled to the contactor through lines 93 and 96, with spent catalyst being purged from the system through line 94 and fresh catalyst (98% $H_2SO_4$) being added to the system through line 95 to maintain catalyst strength at 92% and hydrocarbon:catalyst volume ratio about 1:1.

The separated hydrocarbon effluent phase passes through line 97 and pressure reducing valve 98 whereby pressure is reduced on these hydrocarbons to about 1 p.s.i.g. The resulting chilled flashed hydrocarbon vapor-liquid mixture passes through reactor cooling coils 111 and is discharged through line 112 into vapor-liquid separator 113, along with volatilized materials from the heat exchange. The separated volatile hydrocarbons are withdrawn from vessel 113 through line 115, into knockout pot 116, and then to compressor 117. Herein they are compressed then condensed in condenser 118, and passed through line 119 into depropanizing fractional distillation tower 120.

In depropanizer 120, operated in conventional fashion, propane is separated as an overhead distillate quite sharply from the rest of the materials and discharged from the system through line 112. The remaining bottoms fraction, preponderantly isobutane, can be supplied to flash evaporation by means not shown to chill it, the resulting flashed vapor in such case being recycled into the suction of compressor 117. Optionally, also by means not shown, the depropanizer bottoms can be heat-exchanger with the depropanizer feed and/or the chilled remaining liquid which is collected in separator 113. The isobutane-rich depropanizer bottoms are fed to contactor 110 to maintain a very high (70 mol percent) isobutane relative to total mols of all other hydrocarbons present in the contactor.

The deisobutanizer (tower 102) bottoms, comprising normal butanes and alkylate, are fed into product debutanizer 141, which is operated to give an overhead distillate of normal butane and a bottoms fraction of total alkylate. The total alkylate is withdrawn from the system through line 142, and it can be fractionally distilled in a rerun tower not shown into light alkylate having an end boiling point of 338° F. for aviation fuel and an alkylate bottoms fraction useful for cracking stock or the like.

The normal butane distillate from tower 141 is split into two portions, one part going to line 147 and the balance to line 143 whence it is vaporized in heater 144 and used to strip normal butane from the mineral sorbent in sorbent case 105a as hereinbefore described. The normal butane desorbed from vessel 105a flows through line 146 and is mixed with the balance of the normal butane distillate from line 147. The resulting normal butane stream passes through line 148 and heater 151 wherein it is heated to about 250° F. against a pressure of 250 p.s.i.g., together with supplemental normal butane entering the system through line 149.

The resulting hot normal butane vapor passes through line 150 into olefin knockout drum 142, packed with a 4–8 mesh dry low iron content bauxite granules, thence out lines 153 and 157 into isomerization reactor 158. Promotional hydrogen chloride enters line 157 through line 154, this stream being made of recycle HCl and hydrocarbons from stripper 167, which flow enters through line 156 and is made up with fresh hydrogen chloride entering through line 155. The mol fraction of hydrogen chloride in the feed to the isomerization reactor is maintained at about 5 mol percent.

Isomerization reactor 158 also is packed with the same kind of bauxite granules as the olefin knockout drum and, additionally, there has been sublimed on this bauxite about 6 weight percent of aluminum chloride catalyst. The promoted butane passes through the isomerization reactor and exits through line 159, then through guard chamber 160, also packed with the same kind of bauxite granules (to suppress escape of aluminum chloride from the isomerization reaction system). The isomate product with HCl exits through line 162 and is condensed in condenser 163, withdrawn through line 164, and run in surge drum 165. This isomate is withdrawn through line 166 and fed into HCl stripper 167, hydrogen chloride and some hydrocarbons being recycled to the reactor through line 156 and the balance being withdrawn as a bottoms product of crude isomate through cooler 168.

Separated liquid from vessel 113 flows through line 114 into the heat exchanger 117, then through line 125 into mixer 128, together with crude isomate discharged through line 126. The mixture is neutralized with a recirculating flow of caustic soda solution entering the mixer through line 127. The mixer discharges into caustic settler 129. Caustic solution is recirculated from the settler through line 130 and made up with fresh aqueous sodium hydroxide solution through line 132. A caustic soda purge is taken by means not shown.

The caustic treated hydrocarbon is discharged through line 133 into mixer 135 wherein it is washed with water from line 134. The mixer discharges into water settler 136. Water for recirculation is withdrawn through line 137, made up with fresh water entering line 138, and purged by means not shown. The mixture of neutral crude isomate from stripper 167 (which is about 30% isobutane and the balance n-butane) and the neutral crude alkylate containing, in addition to normal butane and isobutane, the whole alkylate product of contactor 110, is recycled through line 101 with butane feed from line 100 into deisobutanizer 102. Herein it is fractionally distilled as hereinbefore described.

I claim:

1. In a process for catalytic alkylation wherein isobutane in molar excess and at least one alkylatable material are reacted in liquid phase in the presence of an alkylation catalyst in an alkylation zone under alkylation conditions, and resulting hydrocarbons including alkylate, unreacted isobutane and normal butane in a ratio of normal butane to isobutane within the range of about 0.2:1 to about 4:1 are separated from said alkylation catalyst, the improvement which comprises fractionally distilling said resulting hydrocarbon thereby forming a bottoms product comprising alkylate enriched in normal butane and an overhead distillate of isobutane concentrate, maintaining the isobutane content of said ovehead distillate within the range of about 65 to about 85 mol percent, contacting said overhead distillate with a mineral sorbent selective for straight chain hydrocarbon to the substantial exclusion of non-straight chain hydrocarbons producing a treated isobutane effluent stream containing less than 4 mol percent normal butane, passing at least a portion of said treated isobutane to said alkylation zone, fractionally distilling said bottoms product enriched in normal butane separating a normal butane overhead vapor fraction, periodically discontinuing contacting said overhead distillate with said mineral sorbent after sorption of normal butane, and contacting mineral sorbent containing sorbed normal butane with at least a portion of said normal butane overhead vapor fraction effecting desorption of sorbed normal butane from said mineral sorbent.

2. The process of claim 1 wherein the mineral sorbent is a Type A zeolite having effective pore size of about 5 A., the alkylation catalyst used is sulfuric acid, and said alkylatable material is an olefinic hydrocarbon feed stock containing propylene.

References Cited in the file of this patent

UNITED STATES PATENTS

| | | |
|---|---|---|
| 2,281,248 | Putney | Apr. 28, 1942 |
| 2,306,610 | Barrer | Dec. 29, 1942 |
| 2,442,191 | Black | May 25, 1948 |
| 2,649,486 | Putney | Aug. 18, 1953 |
| 2,695,321 | Cines | Nov. 23, 1954 |
| 2,818,455 | Ballard et al. | Dec. 31, 1957 |
| 2,820,074 | Pines | Jan. 14, 1958 |
| 2,882,243 | Milton | Apr. 14, 1959 |
| 2,935,543 | Smith | May 3, 1960 |
| 2,946,832 | Vermillion | July 26, 1960 |
| 2,963,519 | Kasperik et al. | Dec. 6, 1960 |